Dec. 6, 1938. L. DAVIS Re. 20,936

DECALCOMANIA PAPER

Original Filed May 31, 1934

INVENTOR:
Lewis Davis,
BY
his ATTORNEY.

Reissued Dec. 6, 1938 Re. 20,936

UNITED STATES PATENT OFFICE 20,936

DECALCOMANIA PAPER

Lewis Davis, Worcester, Mass., assignor to McLaurin-Jones Co., Brookfield, Mass., a corporation of Massachusetts Original No. 2,023,803, dated December 10, 1935, Serial No. 728,234, May 31, 1934. Application for reissue December 8, 1937, Serial No. 178,834

11 Claims. (Cl. 41—33)

Figure 1:
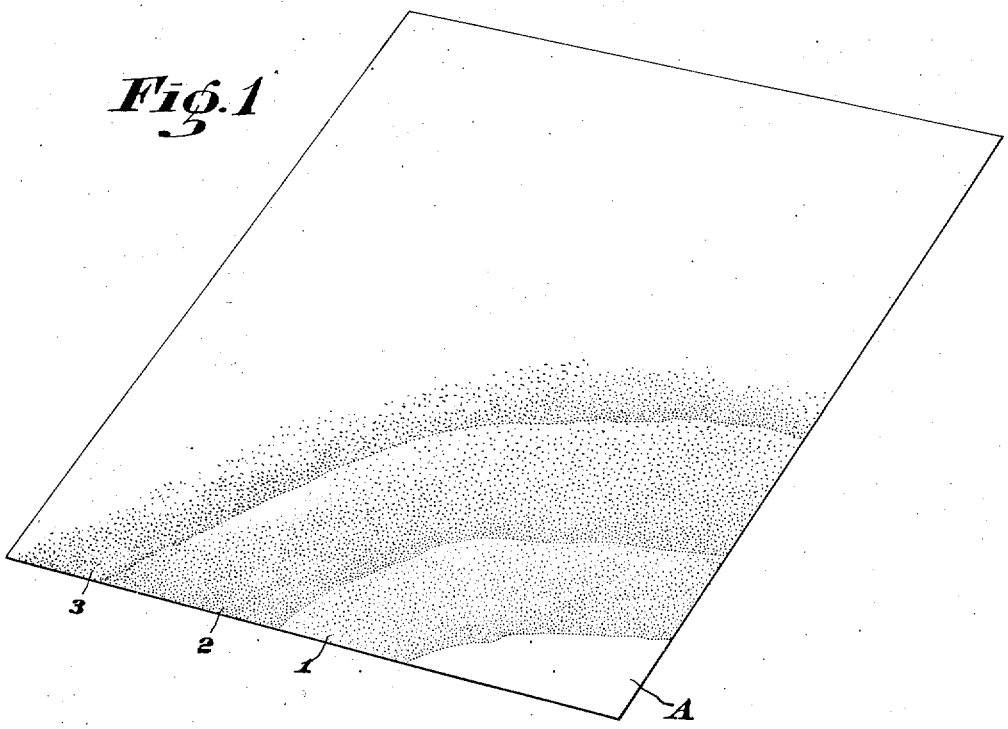

This invention relates to decalcomanias and to the papers on which decalcomania designs are printed.

In applying such designs to some articles of work, especially wood veneers, the use of the necessary quantity of water required to separate the backing sheet from the decalcomania film is highly objectionable because it tends to warp the veneer and makes it difficult to properly register or abut the edges of adjoining sheets. If, in addition, the veneer is to be applied to a wood or other absorbent body or core, which usually is the case, the application of water is still more objectionable. While this difficulty is not particularly serious when the decalcomania design is to cover only a small portion of the work, it is an important factor in applying such designs to the entire surface of a veneer sheet or other absorbent body.

The present invention deals with this problem and aims to devise a thoroughly practical solution for it.

The nature of the invention will be readily understood from the following description when read in connection with the accompanying drawing, and the novel features will be particularly pointed out in the appended claims.

Figure 2:
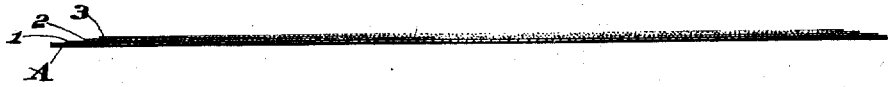

In the drawing,

Figure 1 is a perspective view of a decalcomania paper embodying features of this invention; and Fig. 2 is a vertical, sectional view through the sheet shown in Fig. 1.

The product shown in the drawing comprises a backing sheet A of paper carrying on one face thereof three superposed coats of water resistant material, the respective coatings being designated at 1, 2 and 3. The first and third of these coats may conveniently be of essentially the same composition and both soluble in some non-aqueous liquid. The intermediate coat 2, however, should be composed of some substance which is highly resistant to the solvent for the other two coats. In other words, it is important that each of these coating materials be readily soluble in a solvent to which the other is highly resistant. From a cost standpoint it is desirable also that the solvents which must be used in practice be relatively inexpensive.

I have found that these requirements can be satisfactorily met by making the first and third coats of the synthetic resin known commercially as cumar, and the intermediate coat 2 of gum sandarac. Diluents may be used with either constituent. Cumar is known chemically as a coumarone-indene resin and may be defined as a mixture of para-coumarone, para-indene, and the polymers of other hydrocarbons found in coal tar. It is a neutral resin produced from coal tar distillates and is soluble in a considerable variety of common solvents such as gasolene and other petroleum distillates, ethyl and amyl acetates, carbon tetra-chloride, and others. It is, however, insoluble in either alcohol or ether. Gum sandarac is substantially unaffected by the solvents above mentioned for cumar, but is readily soluble in ethyl alcohol, methyl alcohol, amyl alcohol, and ether. Consequently, these resinous substances satisfy the present requirements.

In preparing the coating materials for application to the backing sheet, it should be borne in mind that the outer coating 3 must be very flat, smooth, and free from imperfections since the decalcomania design will be printed on this surface. For this reason it is desirable to associate suitable plasticizers with the cumar resin and the solvents for it in order to produce a coating of the desired smoothness. Since the least expensive of the solvents for the cumar consists of a petroleum distillate, it is preferable to use this material. Assuming that in the final product each cumar coat is to weigh four pounds to the ream, with sheets 20 x 24 inches, a suitable composition may be composed of the following ingredients:

| | Grams |
|---|---|
| Cumar | 814 |
| Ethyl acetate | 424 |
| Butyl cellosolve | 12 |
| Dibutyl phthalate | 48.5 |
| Troluoil | 725 |

Of these constituents the chief solvent is the troluoil which is a petroleum distillate having a boiling range of from about 99° to 116° C. Other petroleum fractions, however, can be substituted for it. The ethyl acetate is a solvent aid. The dibutyl phthalate is a plasticizer, and the butyl cellosolve (ethylene glycol monobutyl ether) performs similar functions, acting as a leveling agent.

This composition produces a very smooth satisfactory coating suitable for both the first and last coats 1 and 3.

For the intermediate coat 2 a solution of gum sandarac alone in denatured alcohol can be used. However, it is preferable from a cost standpoint to reduce the quantity of gum sandarac used by some suitable diluent such as rosin (colophony), shellac, or the like. A composition suitable to go with that above described consists of the following:

| | Grams |
|---|---|
| Gum sandarac | 778 |
| Rosin | 1036 |
| Denatured alcohol (Formula #5) | 910 |

In the process of manufacture either a sized paper or an absorbent sheet such as that commonly used heretofore in the manufacture of decalcomania paper, may be used for the backing sheet A. The coat 1 of cumar prepared in the manner above described is applied to the surface of this backing sheet and, when this coating has dried sufficiently, the second coat 2 of rosin sandarac mixture is applied, the final coat of cumar being superposed on the intermediate coat 2 after the latter has dried. The paper so prepared is shipped to the decalcomania manufacturer who prints his design on the surface of the outer coat 3. The decalcomania so produced may be of the ordinary transfer variety or of the so-called "slide off" type. In either event it is freed from the backing sheet 2 during the application of the design to the work by applying a solvent such as ordinary gasolene, toluol, troluoil, or the like, to the backing sheet, thus softening the inner coat 1 of cumar, and permitting the backing sheet to be pulled off. During this operation the intermediate coat 2 of rosin sandarac mixture protects the outer coat and the design printed on it from the action of the solvent.

In some cases the innermost coat 1 of cumar can be omitted, the coat of rosin sandarac mixture being applied to the paper first and the cumar coat on top of it. In such an event the backing sheet is removed by applying alcohol or one of the other sandarac solvents to it. It is more satisfactory, however, to use three coats since the coat 2 is somewhat spongy and porous in character and it may be penetrated by portions of the upper coat during the application of the latter and produce a staining of the backing sheet which would be objectionable from the standpoint of saleability of the goods.

In making the cumar composition it is preferable to use the hardest grade of this resin, especially for the outer coat, and to make a solution of a fairly high concentration, say at least 60%. Other gums, such as ester gum, can be used instead of part or all of the cumar resin, although I have not found it as satisfactory as the latter. By "ester gum" I mean the compound which also goes under the names of rosin ester or glycerinated rosin. Araclor resin can also be used to supplant a part of the cumar. This resin consists of chlorinated diphenyl and other chlorinated diaryls. While, as above stated, I prefer to use gum sandarac as the chief constituent of the intermediate coat, other gums soluble in alcohol can be substituted for it, such for example, as dewaxed dammar gum. I have found nothing, however, as satisfactory for this purpose as gum sandarac.

An important advantage of the product above described is that the outermost cumar coat is not substantially affected by the more common solvents used in the inks with which the decalcomania designs are printed on this surface. Also, it is a common practice to apply a coating of clear lacquer over the decalcomania design, and the cumar resin coat is highly resistant to the solvents commonly used in these lacquers. In some cases, however, an ink may be used which, from a chemical point of view, is really a varnish or paint, and includes a vegetable oil or some other constituent which does attack the cumar coat. Inks of this type, however, are practically insoluble in alcohol. Consequently, when such an ink is to be used it is preferable to prepare a decalcomania paper especially for them which will be exactly like that above described except that the coats will be reversed. In other words the first and third coats will consist of the gum sandarac rosin mixture while the intermediate coat 2 will have cumar, or its equivalent, as its essential constituent.

In applying decalcomanias of this type to veneer and other water absorbing bodies, some absorption of the solvent may occur, but these solvents are so volatile that they evaporate rapidly and do not produce any warping of the veneer. Consequently, they completely avoid the objection above described to the use of common forms of decalcomanias. As above stated, a considerable variety of these volatile solvents of a hydrocarbon nature are available at reasonable prices so that the expense involved in the use of such a solvent instead of water is not a serious practical objection.

Having thus described my invention, what I desire to claim as new is:

1. A decalcomania paper comprising a suitable backing sheet, a water resistant coating carried by said sheet to take decalcomania printing, and a protective coating of resinous water resistant material between the first mentioned coating and said sheet, said protective coating being substantially insoluble in a solvent which readily dissolves the other coating.

2. A decalcomania paper comprising a suitable backing sheet, a water resistant resinous coating carried by said sheet to take decalcomania printing, and an intermediate coating of resinous water resistant material bonding the first coating to said backing sheet, each of said coatings being readily soluble in a solvent to which the other coating is highly resistant.

3. A decalcomania paper comprising a suitable backing sheet and a plurality of water resistant resinous coatings on one face of said sheet in superposed relationship. The adjoining coatings being differentially soluble in non-aqueous solvents.

4. A decalcomania paper comprising a suitable backing sheet, and a plurality of coatings of water resistant resinous material in superposed relationship on one face of said sheet, each of said coatings being soluble in a solvent to which the adjoining coating is highly resistant.

5. A decalcomania paper comprising a suitable backing sheet, a plurality of coatings of water resistant material in superposed relationship on one face of said sheet, the predominating constituent of one of said coatings being coumarone-indene resin while the other consists essentially of a mixture of gum sandarac and rosin.

6. A decalcomania paper comprising a suitable backing sheet, and three water resistant coatings carried by one face of said backing sheet in superposed relationship to each other, one of said coatings being soluble in alcohol, another in a petroleum distillate, and the third in one only of said solvents, the middle coating being substantially insoluble in the solvent for the coatings on opposite sides of it, and the latter being substantially insoluble in the solvent for the middle coating.

7. A decalcomania paper comprising a suitable backing sheet and a water resistant coating of a resinous nature carried by said sheet to take decalcomania printing, said coating being bonded to said sheet by a water resistant union releasable by a non-aqueous volatile solvent.

8. A decalcomania paper comprising a suitable backing sheet and a water resistant coating carried by said sheet to take decalcomania printing, said coating being highly resistant to the common solvents used in printing inks and being bonded to said sheet by a water resistant union releasable by a non-aqueous solvent of a hydrocarbon nature.

9. A decalcomania paper comprising a suitable backing sheet, a water resistant coating of a resinous nature carried by said sheet to take decalcomania printing, said coating being resistant to the common solvents used in printing inks, and a protective coating of water resistant material bonding said resinous coating to said backing sheet, said resinous coating being substantially insoluble in a solvent which readily dissolves the protective coating.

10. A dacalcomania paper comprising a suitable backing sheet and a highly water resistant coating on one face of said sheet, a decalcomania print on said coating, said coating being highly resistant to the common solvents used in printing inks and being adhesively united with said sheet by a water resistant union releasable by a volatile non-aqueous solvent.

11. A decalcomania comprising a suitable backing sheet of paper, a water resistant coating on one face of said sheet, a decalcomania print including a lacquer coating on said water resistant coating, said water resistant coating being highly resistant to the solvents used in the composition of said print and being adhesively united with said sheet by a water resistant union releasable by a non-aqueous solvent to which the print is highly resistant.

LEWIS DAVIS.